United States Patent
Andre et al.

(10) Patent No.: US 6,327,998 B1
(45) Date of Patent: Dec. 11, 2001

(54) DEVICE FOR TRAINING AN ANIMAL ON THE LEASH

(75) Inventors: Max Andre; Xavier Aubry, both of Chamalières (FR)

(73) Assignee: Dynavet S.A.R.L., Clermont-Ferrand (FR)

( * ) Notice: Subject to any disclaimer, the term of this patent is extended or adjusted under 35 U.S.C. 154(b) by 0 days.

(21) Appl. No.: 09/308,764
(22) PCT Filed: Nov. 20, 1997
(86) PCT No.: PCT/FR97/02088
   § 371 Date: May 21, 1999
   § 102(e) Date: May 21, 1999
(87) PCT Pub. No.: WO98/21940
   PCT Pub. Date: May 28, 1998

(30) Foreign Application Priority Data

Nov. 21, 1996 (FR) ................................... 96 14716

(51) Int. Cl.⁷ ................................................. A01K 15/02
(52) U.S. Cl. .............................................................. 119/712
(58) Field of Search ................................... 119/718, 719, 119/792, 795, 798, 665, 720

(56) References Cited

U.S. PATENT DOCUMENTS

| | | | |
|---|---|---|---|
| 2,023,950 | 12/1935 | Carter . | |
| 3,072,097 | * 1/1963 | Morchand | 119/719 |
| 4,627,385 | * 12/1986 | Vinci | 119/718 |
| 5,046,453 | * 9/1991 | Vinci | 119/718 |
| 5,125,365 | * 6/1992 | Bonilla | 119/776 |
| 5,353,744 | * 10/1994 | Custer | 119/719 |
| 5,501,179 | 3/1996 | Cory . | |
| 5,775,970 | * 7/1998 | Klees et al. | 446/297 |
| 5,799,618 | * 9/1998 | Van Curren et al. | 119/721 |
| 5,868,103 | * 2/1999 | Boyd | 119/719 |
| 5,911,198 | * 6/1999 | Curen et al. | 119/720 |
| 6,047,664 | * 4/2000 | Lyerly | 119/719 |
| 6,058,889 | * 5/2000 | Van Curren et al. | 119/721 |

FOREIGN PATENT DOCUMENTS

| | | |
|---|---|---|
| 2625646 | 7/1989 | (FR) . |
| 2700665 | 7/1994 | (FR) . |
| 8004998 | 4/1982 | (NL) . |

* cited by examiner

*Primary Examiner*—Thomas Price
(74) *Attorney, Agent, or Firm*—Horst M. Kasper

(57) ABSTRACT

The invention relates to a device for the education of behavior to an animal held on a leash. A leash (14, 16, 18) is employed for a positive holding of the animal carrying a collar (16) or a harness, wherein the leash is composed of a handle (18) constructed to be held by a user, and of a cord (14) mechanically connected to the handle (18) and the harness (16). The device comprises in addition a disciplining and sanctioning feature of the type creating a moderate disturbance, which moderate disturbance is perceived by the animal and ordering member for putting the sanctioning means into action. The sanctioning means are of the type of projecting a fluid, wherein the device comprises a reservoir container of fluid (2) under pressure, a valve (4) for releasing the fluid outside of said reserve container, a nozzle (6) projecting the released fluid and a member of ordering (8) of the opening of the valve. The ordering member (8) is supported by the handle (18), while the spraying nozzle (6) is supported by the collar (16).

21 Claims, 1 Drawing Sheet

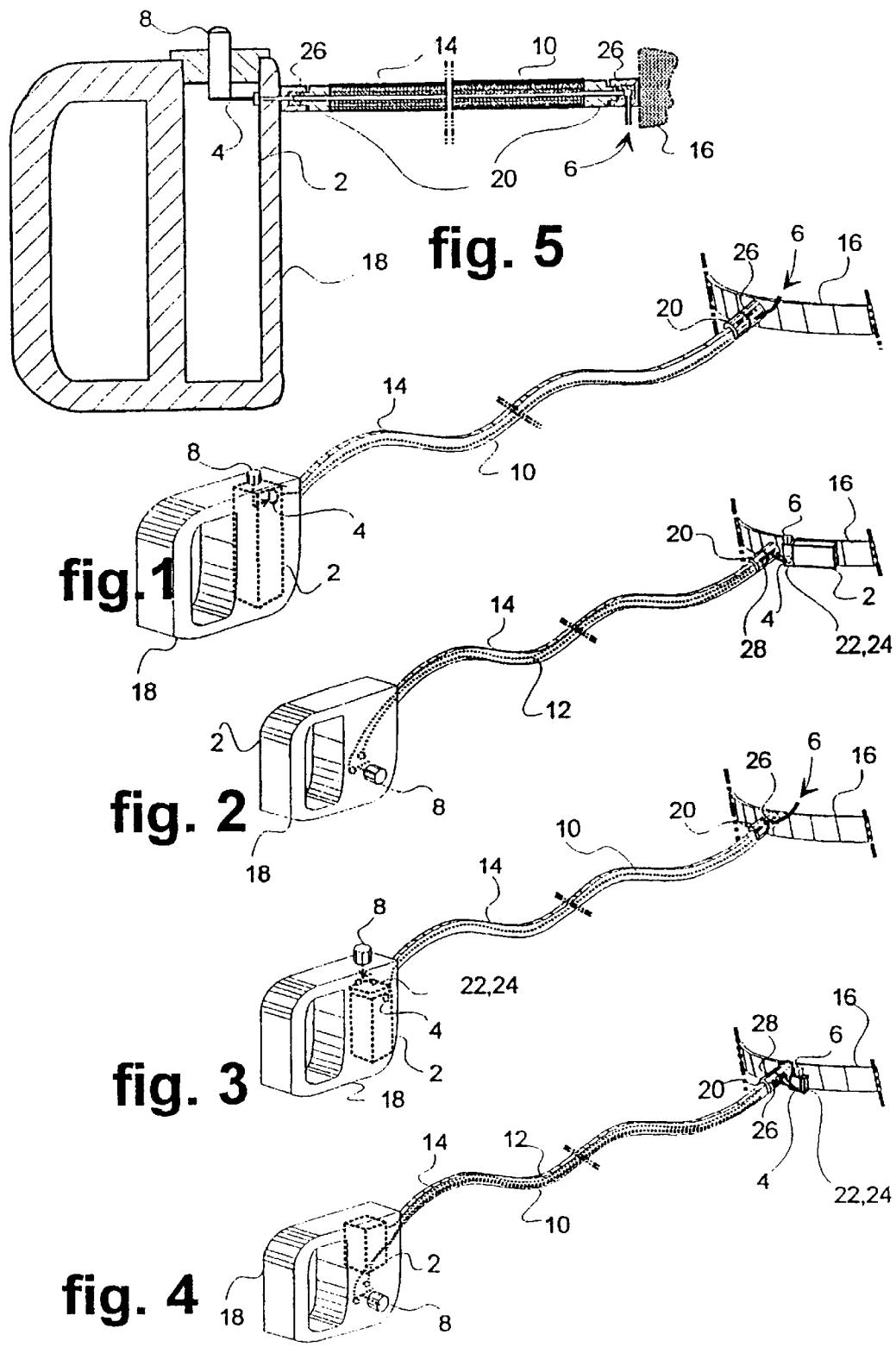

DEVICE FOR TRAINING AN ANIMAL ON THE LEASH

CROSS-REFERENCE TO RELATED APPLICATIONS

This application is a 371 of PCT/FR97/02088 filed Nov. 20, 1997.

STATEMENT REGARDING FEDERALLY SPONSORED RESEARCH OR DEVELOPMENT (not applicable)

REFERENCE TO A "MICROFICHE APPENDIX"

(not applicable)

BACKGROUND OF THE INVENTION

1. Field of the Invention

The invention is in the field of accessories for domestic animals and it has the object to provide a device allowing the education of an animal held on a leash.

2. Description of the Related Art including information disclosed under 37 CFR 1.97 and 1.98.

Various devices for sanctioning an animal at a distance are known by a user, where the user determines the behavior of the animal to be at fault.

Among these devices one knows of those which allow the user to intervene while he has the animal at a leash. The means for disciplining can be punishing means by delivering an electric shock, by intermediate piezo electric means or based on a reserve of energy such as is described in the U.S. Pat. No. 2,023,950 (Hicks), Dutch Patent NL 8004998 (Dingeman) and German Patent DE 3300468 (Kullman), or by sound means of a moderate disturbance, such as described in the French Patent FR 20700665 (Jardin).

The use of the sanctioning means results either in a pulling exerted on the leash, such as is described in the German Patent DE 3300468 (Kullman) or in French Patent FR 2700665 (Jardin), or also is ordered directly by the educator based on the handle of the leash such as is described in the U.S. Pat. No. 2,023,950 (Hicks) and Dutch Patent NL 8004998 (Dingeman).

The concept of a device for the education of animals relieves a pragmatic approach and analysis of their impact with the goal of determining in an intuitive fashion the conditions of their operation. In the case of educational devices of an animal held on the leash it has become clear to the applicant, that the difficulties, which are to be overcome, lie in the compromise to be found between, on the one hand, the effectiveness of the sanction and its reliability, without considering how much the sanction is another perturbing means for the animal, and on the other hand an ergonomy looking to make its use easy for the educator without increasing the encumbering beyond that which is usually of a leash with its holder, and looking for allowing the user to sanction the animal freely while maintaining a strong hold.

An inconvenience of the devices, where the sanction is applied with an electric shock, resides in the fact that the sanction is a punishment; it has become clear to the applicant that it would be preferable to surprise the dog by a moderate disturbance, which the dog perceives, such as by sound means as described in the French Patent FR 2700665 (Jardin), more than inflict a pain on the dog, which would have the consequence of making the dog aggressive. In addition, the effecting of a high tension or pulling on the leash is not desirable, because it represents a risk in case of a deterioration of the cord of the leash, which would imply equipping specific means, which are not desirable and costly.

The French Patent FR 20700665 (Jardin) proposes to perform the sanction either by means of the type of a radio frequency, or under the effect of a pulling, exercised on the leash, according to the fashion of German Patent DE 3300468 (Kullman).

A major inconvenience of an order by radio frequency is associated with the fact that it does not simultaneously allow to hold positively the animal such as by means of a leash.

The inconvenience of an order under the effect of a pulling exercised on the leash, is a solo shifted with the fact that the use shows, that said order cannot be directly caused by a voluntary act of the user, but resulted by the exercised pulling by the animal on the leash, which limits this action to be performed as a sanctioning means.

Concluding, it is apparent to the applicant that none of the existing devices would be satisfying, because of the selections made by the conceivers of the prior art and the compromises flowing therefrom.

In addition, one knows devices for sanctioning a dog when the dog barks, containing mainly the means of fogging of a fluid, the operation of which is placed under the dependency of the means of detection of the barking of the dog. In particular one can refer to the French Patent FR 2625646 (Vinci), which describes a device of this kind.

BRIEF SUMMARY OF THE INVENTION

The purpose of the present invention is to furnish a device for the education of an animal held on leash, where the kind of the sanction be a moderate disturbance causing a simple surprise with the animal and not making any call for a source of electric energy of high voltage to be directed along the cord of the leash, wherein the order means allows the user to freely sanction an action of the animal while maintaining the animal firmly, and this on the one side whatever the action of the animal and on the other side without that the encumbering of the device would have an effect on the comfort of positively maintaining the animal by the user.

The inventive step of the applicant comprises selecting a sanction of the type of those of a moderate disturbance, by projecting a fluid, which can be ordered freely by a user from a handle of a leash by a positive holding means for the animal, by way of the intermediate means of order containing an order button disposed in the handle of the leash and a wire connection disposed in the cord of the leash to connect the command button to a spraying nozzle of fluid carried by the animal, wherein the selection of the sanction by projecting the fluid is narrowly connected with the possibility already represented, primarily to conceive means of order for which the wire connection forms an agent carrier, which is relatively inoffensive, in particular, low voltage electricity would activate a solenoid valve associated with the projection spraying nozzle or also associated directly with the projected fluid, and in a second place to dispose the reserve of the fluid, be it at the interior of the handle, or in the collar of the animal, in order to not increase the general encumbering of the leash.

The present invention will be better understood and the relevant details will appear to the description, which comprises different examples of embodiments, with relation to the figures of the attached drawing sheets, wherein:

BRIEF DESCRIPTION OF THE SEVERAL VIEWS OF THE DRAWING(S)

FIGS. 1 to 4 are schematic diagrams which illustrate in a perspective view different forms of realization of the invention;

FIG. 5 is an illustration in a sectional view of a device of the invention according to the embodiment represented in FIG. 1.

DETAILED DESCRIPTION OF THE INVENTION

A device for the education of behavior to an animal held on the leash is shown in the figures and is of the general type of that described by the French Patent FR 2700665 (Jardin), based on the essential choice of the kind of sanction of the type creating a moderate disturbance, which the animal perceives. This device comprises, in addition to the order means to be realized, means for putting the sanction means in operation, a leash 14, 16, 18 for a positive hold of the animal holder of a collar 16 or of a harness. The leash is composed of a handle 18 furnished to be held by the user and by a cord 14 linking mechanically the handle 18 and to the collar 16.

According to a general feature of the device relevant for the present invention, the disciplining means are of the type of projecting a fluid. The device comprises a reserve compartment of the fluid 2 under pressure, a valve 4 for the freeing the fluid out of the said reserve container, a nozzle 6 for projecting the freed fluid, and a member 8 to order the opening of the valve. The latter member 8 is supported by the handle 18, where a nozzle for projecting 6 is supported by the collar 16. A wire connection 10, 12 is a carrier of an agent which is relatively not aggressive, of the type as described further down in different forms of realization of the invention, and which is in particular of electricity of low voltage or a fluid, which is disposed in the cord 14 and which connects the said command member 8 and the spraying nozzle 6, for allowing the user, who holds the animal on the leash, and holding it steadily, to order the projection of the fluid in the surrounding of the animal, when the user decides that there is a faulty action by the animal.

These constructions are such, that the selections of the applicant allow to respond to the totality of objects recited for presenting a device which performs comfortably and reliably, and at a competitive cost.

The reservoir container for the fluid 2 and the valve 4 are disposed in the handle 18 according to FIG. 1. The command member 8 is formed by button of handing of the valve 4. The said wire connection formed by a channel 10 connecting the valve 4 and emerging outside of the cord 14 in the neighborhood of the fixation means 20 of the latter cord 14 at the collar 16 of the animal, with the remote orifice of the channel 10 forming advantageously itself the nozzle of projection 6.

The valve 4 is an electric valve containing a reserve of electric energy under low voltage 22 and an electromagnet 24 for the operation of the valve 4 according to FIGS. 2, 3, and 4.

The reservoir container of fluid 2, the nozzle 6 and the electric valve 4, 22, 24 are supported by the collar 16 as shown in FIG. 2. The command member at 8 is formed by a closure interrupter of the circuit of the electromagnet 24. The wire connection is formed by a two wire electric connection 12 of an electric command signal of low voltage.

The reservoir container of fluid 2 and the electric valve 4, 22, 24 are supported by the handle 18 according to FIG. 3. The command member 8 is formed by an interrupter of the closing of the circuit of the electromagnet 24. The wire connection is formed by a channel 10 connecting to the valve 4 and emerging outside of the cord 14 in the neighborhood of the fixation means 20 of the cord 14 at the collar of the animal, with the remote opening of the channel 10 advantageously itself forming the spraying nozzle 6.

The nozzle 6 and the electric valve 4, 24, 22 are supported by the collar 16 of the animal according to FIG. 4, while the reservoir container of the fluid 2 is supported by the handle 18. The command member 8 is formed by an interrupter of the closure of the circuit of the electromagnet 24. The wire connection is formed on the one hand by a channel 10 disposed between the reserve container of the fluid 2 and the valve 4, and on the other hand by an electrical double wire connection valve of an electric command signal under low voltage connecting the interrupter 8 to the electromagnet 24.

One will note that for avoiding the twisting of the wire connection 10, 12, and in particular the twisting of the channel 10 compromising the free circulation of the fluid:

1. The devices schematically shown in FIGS. 1 and 3, carry the channel 10 fixed to the handle 18 by the intermediate of a pneumatic connection winding 26, the cord 14, as far as that is concerned, being fixed to the collar 16 of the animal and to the handle 18 by the intermediate of the sprocket wheels 20, sprocket wheels 20 and a pneumatic connection winding 26 of the proximal extremity of the cord 14 being disposed coaxially.

2. The device schematically shown in FIG. 2, includes an electrical two wire connection 12 connected to the handle 18 and to the collar 16 by the intermediate of winding electrical contacts 28, the cord 14 which is affixed to the collar 16 of the animal and to the handle 18 by the intermediate of sprocket wheels 20, with the sprocket wheels 20 and the winding electrical contacts 28 being coaxial.

3. The device schematically shown in FIG. 4, carries a two wire electrical connection 12 connected to the handle 18 and to the collar 16 by the intermediate of electrical winding contacts 28, and a pneumatic channel 10 connected to the collar 16 and to the handle 18 by the intermediate of pneumatic winding connections 26, the cord 14 being affixed to the collar 16 of the animal and to the handle 18 by the intermediate of sprocket wheels 20, sprocket wheels 20, electrical winding contacts 28, and pneumatic winding connections 26 being disposed coaxially.

One will understand that in a general manner, a cord of the leash 14, also of interest in the present invention, is characterized by:

a) in that it incorporates a wire connection formed by at least anyone of the elements of the group of elements including a channel 10 and a two wire electrical connection 12, b) in that it is furnished at each of its ends of the sprocket wheels 20 for respectively its fixation at the handle 18 and at a collar 16, c) in that it is equipped at anyone of its hands of anyone of at least the elements of the group of elements including winding electrical contacts 28 and a pneumatic winding connection 26 for the respective connection of the two wire electrical connection 12 and of the channel 10, respectively, at the handle 18 and at collar 16, sprocket wheels 20, winding electrical contacts 28, and pneumatic connection 26 being coaxially at the ends with respect to the cord 14.

The cord 14 recited above, taken independently, furnishes the advantage of being replaced after usage, or to allow the user to select a cord 14, a handle 18 and collar 16 in a shop among a plurality of models different from each other.

The cord 14 is in principle formed by a conduit formed by extrusion and re-clothed by a reinforcement, which is evidently of the conduct which forms the said channel 10 according to FIGS. 1 and 3.

According to other forms of embodiments of the cord 14:

1. The cord 14 of the leash can in principle be formed by a conduit disposed coaxially relative to another conduit forming the channel 10. The two conduits are preferably in sliding contact or jointly formed by extrusion, or also a space is furnished between the two conduits in order to allow the passage of the electrical two wire connection, or also that, the conduit forming the cord is clothed by a reinforcement incorporating the electrical two wire connection,
2. The channel 10 can be formed by a conduit disposed in a cord 14 of a leash formed by weaving, wherein the two wire electrical connection is disposed inside, or is part of the weaving of the cord 14.

One observes that in a general fashion the pulling effort of the animal on the cord 14 is in no case supported by the wire connection 10 and/or 12, but that the material forming totally or partially the cord 14, and in particular by the reinforcement by which it is preferably clothed are of such a kind that the positive hold of the animal by the user cannot change the wire connection 10, 12 under the effect of the pulling efforts exercised on the leash.

For example, the elasticity module of the cord 14 is higher than the elasticity module of the wire connection 10, 12. For example also, the cord 14 of the leash incorporates threads or cables supporting the pulling efforts between the handle 18 and the collar 16. For example, finally, that the cord 14 is of the type "strap" with linked threads and interlaced threads, and the electrical two wire connection 12 forms certain linked threads.

One will observe finally that without disclaiming the general rule of the invention, and according to one embodiment looking for exploiting the projection of the fluid, not only for a noise effect but in order to produce a disturbing sound for the animal, the nozzle 6 is furnished with a whistle generator of sound based on the fluid furnished by the reserve container 2.

One will observe finally that the reserve container of the fluid 2, either can be advantageously formed by a not movable cartridge, which can be replaced after having been emptied of its contents, or it can be a rechargeable reserve container.

What is claimed is:

1. A device for the education of behavior to an animal held on a leash, of the kind of the device including a leash (14, 16, 18) for a positive holding of the animal carrying a collar (16) or a harness, wherein the leash is composed of a handle (18) designed to be held by a user, and of a cord (14) mechanically connected to the handle (18) and the harness (16), wherein the said device comprises in addition disciplining means of the type creating a moderate disturbance, which the animal perceives and ordering means for putting the sanctioning means into action, wherein:

the sanctioning means are of the type of projecting a fluid, wherein the device comprises a reservoir container of fluid (2) under pressure, a valve (4) for releasing the fluid outside of said reserve container, a nozzle (6) projecting the released fluid and a member of ordering (8) of the opening of the valve, wherein the latter ordering member (8) is supported by the handle (18), while the spraying nozzle (6) is supported by the collar (16), wherein a wire connection (10, 12), disposed in the cord (14) connecting the said member of ordering (8) and the nozzle for projecting (6), in order to allow the user, who has the animal on the leash to order the projection of the fluid in the neighborhood of the animal, when the user determines the action of the animal to be at fault, while holding firmly the animal.

2. The device according to claim 1, wherein (FIG. 1 and FIG. 5):

the reserve container of the fluid (2) and the valve (4) are disposed in the handle (18), wherein the said ordering member (8) is formed by a button for handling the valve (4), and wherein the said wire connection is formed by a channel (10) communicating with the valve (4) and emerging outside of the cord (14) in the neighborhood of a fixation means (20) of the latter cord (14) on the collar (16) of the animal.

3. The device according to claim 1, wherein:

the valve is an electric valve comprising a reserve of electrical energy under low voltage (22) and an electromagnet (24) for the handling of the valve (4).

4. The device according to claim 3, wherein the reserve container of the fluid (2), the nozzle (6) and the electric valve (4, 22, 24) are supported by the collar (16), wherein the commanding member (8) is formed by an interrupter of the closure of the circuit of the electromagnet (24), and the said wire connection is formed by a two wire electrical connection (12) of an electrical command signal of low voltage.

5. The device according to claim 4, wherein the reserve container of the fluid (2) and the electric valve (4, 22, 24) are supported by a handle (18), wherein a command member (8) is formed by an interrupter of the closing of the circuit of the electromagnet (24), and wherein the wire connection is formed by channel (10) connecting between the valve and emerging outside of the cord (14) in the neighborhood of the fixation means (20) of the cord (14) at the collar (16) of the animal.

6. The device according to claim 3, wherein the nozzle (6) and the electric valve (4, 22, 24), are supported by the collar (16) of the animal, while the reserve container of the fluid (2) is supported by the handle (18), wherein the command member (8) is performed by an interrupter of the closing of the circuit of the electromagnet (24), and wherein the wire connection is formed on the one hand by a channel (10) interdisposed between the reserve container of the fluid (2) and the valve (4), and wherein on the other hand a two wire electrical connection (12) of an electrical command signal of low voltage connects the interrupter (8) to the electromagnet (24).

7. The device according to claim 2 or 5, wherein the channel (10) is fixed to the handle (18) by the intermediate of a winding pneumatic connection (26), and wherein the cord (14) is fixed to the collar (16) of the animal and to the handle (18) by the intermediate of swivels (20).

8. The device according to one of the claims 4 and 6, wherein:

the two wire electrical connection (12) is connecting to the handle (18) and to the collar (14) by the intermediate of the electrical winding contacts (28), and wherein the cord (14) is fixed to the collar (16) of the animal and to the handle (18) by the intermediary of swivels (20).

9. The device according to claim 6, wherein:

the channel (10) is fixed of the handle (18) and to the collar (16) by the intermediary of a winding pneumatic connection (26).

10. The device according to one of the claims 2 and 5, wherein:
the cord (14) is in principle formed by a conduit generated by extrusion and clothed by a reinforcement wherein the space hollowed out of the conduit is formed by the said channel (10).

11. The device according to one of the claims 2, 5 and 6, wherein:
the channel (10) is formed by a conduit disposed in the cord (14) made of a tissue.

12. The device according to one of the claims 2, 5, and 6, wherein:
the cord (14) is in principle formed by a conduit having coaxially another conduit forming the channel (10).

13. The device according to claim 1, wherein:
an elasticity module of the cord (14) is higher as compared with an elasticity module of a wire connection (10, 12),
wherein the wire connection (10, 12) is of such a kind that it maintains positively the animal by the user and cannot change the wire connection (10, 12) under the effect of the pulling efforts exerted on the leash.

14. The device according to claim 1, wherein:
the cord (14) incorporates threads supporting the tensioning efforts between the handle (18) and the collar (16).

15. The device according to claim 1, wherein the cord (14) is of the type "strap" with linked threads and interlaced threads, wherein:
the wire connection (12) forms certain chained threads.

16. The device according to claim 1, wherein
the cord incorporates a wire connection formed by one of several of the elements of the group of elements comprising a channel (10) and an electrical two wire connection (12),
wherein the cord is equipped at each of its ends with a swivel (20) for respectively fixing the cord to a handle (18) and to a collar (16), and
wherein the cord is furnished at least at any one of its extreme ends with at least one of several elements of the group of elements consisting of a winding electrical contacts (28) and a pneumatic winding connection (26) for the respective connection of the two wire electrical connection (12) and of the channel (10) to, respectively, a handle (18) and to a collar (16), swivels (20), winding electrical contacts (28) and pneumatic connections (26) being coaxial with the extreme ends relative to the cord (14).

17. A device for the education of behavior to an animal held on a leash comprising
a handle of a flat rectangular shape having a front face, a rear face, an upper side, a hand side and a lower side, wherein the faces of the rectangle have a length which is a multiple of the thickness of the flat rectangular shape, wherein the flat rectangular shape is subdivided into a gripper section and a trigger section by a web running parallel to first parallel outer sides of the flat rectangular shape, wherein the gripper section exhibits a breakout for passing through terminal members of a hand other than a thumb from one side, wherein the breakout is rounded on the side of the breakout facing inner faces of the terminal members of the hand;
a trigger disposed on the trigger section;
a collar to be placed on an animal;
a cord connecting the trigger section to the collar;
a reservoir for a fluid to be distributed over part of a surface of the animal held with the cord;
a valve for the fluid and connected to the reservoir and connected to the trigger;
a nozzle for dispensing the fluid upon triggering disposed on the collar and connected to the valve.

18. The device for the education of behavior according to claim 17 further comprising
a pin disposed on the trigger section for forming the trigger; and
wherein the handle is substantially rigid.

19. The device for the education of behavior according to claim 18,
wherein the reservoir is disposed within the trigger section;
wherein an outer side edge of the gripper section corresponding to the hand side and the upper side is rounded;
wherein the pin is disposed on the upper side of the handle.

20. The device for the education of behavior according to claim 19 further comprising
an electromagnet circuit disposed in the trigger section and connected to the trigger for actuation by the trigger, wherein the valve is disposed in the trigger section, wherein the electromagnet circuit is connected to the valve;
a tube connected to the valve and to the nozzle and running along the cord for transferring fluid from the valve to the nozzle.

21. A device for the education of behavior to an animal held on a leash comprising
a collar carried by an animal;
a handle constructed to be held by a user;
a cord (14) attached to the collar for a positive holding of the animal carrying the collar (16) and attached to the handle, wherein the handle (18), and the cord (14) mechanically connected to the handle (18) form a leash;
disciplining means of the type creating a moderate disturbance, which the animal perceives and ordering means for putting the sanctioning means into action, wherein the disciplining means are of the type of projecting a fluid;
a reservoir container of fluid (2) under pressure;
a valve (4) connected to said reservoir container for releasing the fluid outside of said reservoir container;
a nozzle (6) connected to the valve and projecting the released fluid, wherein while the spraying nozzle (6) is supported by the collar (16);
an ordering member (8) of the opening of the valve, wherein the ordering member (8) is supported by the handle (18);
a wire connection (10, 12), disposed in the cord (14) connecting the said ordering member (8) and the nozzle for projecting (6), in order to allow the user, who has the animal on the leash to order the projection of the fluid in the neighborhood of the animal, when the user determines the action of the animal to be at fault, while holding firmly the animal.

* * * * *